METHOD FOR CONVERTING AN AMPLITUDE MODULATED ELECTRICAL
SIGNAL INTO A FREQUENCY MODULATED ELECTRICAL SIGNAL
Filed July 17, 1967

Inventors
F. BUCHY
P. BAUDUIN
By
Holcombe, Wetherill & Brisebois
Attorneys

United States Patent Office 3,546,632

Patented Dec. 8, 1970

3,546,632

METHOD FOR CONVERTING AN AMPLITUDE MODULATED ELECTRICAL SIGNAL INTO A FREQUENCY MODULATED ELECTRICAL SIGNAL

Francois Buchy, Fontenay-aux-Roses, and Philippe Bauduin, Caen, France, assignors to Anvar Agence Nationale de Valorisation de la Recherche, Puteaux, France Filed July 17, 1967, Ser. No. 653,816

Claims priority, application France, July 19, 1966, 69,940

Int. Cl. H03c *3/38;* H04b *9/00;* G02f *1/38*

U.S. Cl. 332—16 12 Claims

ABSTRACT OF THE DISCLOSURE

Method for converting amplitude modulated signals into frequency modulated signals by irradiating part of a face of a single crystal made from a piezo-electric photo-conductive semi-conducting material, said crystal being supplied with an amplitude modulated D.C. voltage extending parallel to the face of its crystallizing hexagon, through a negative contact on a surface smaller than that carrying its positive contact thus causing said crystal to emit frequency modulated signals which are taken from the terminals of a resistor introduced in said supply circuit.

Figure 1:
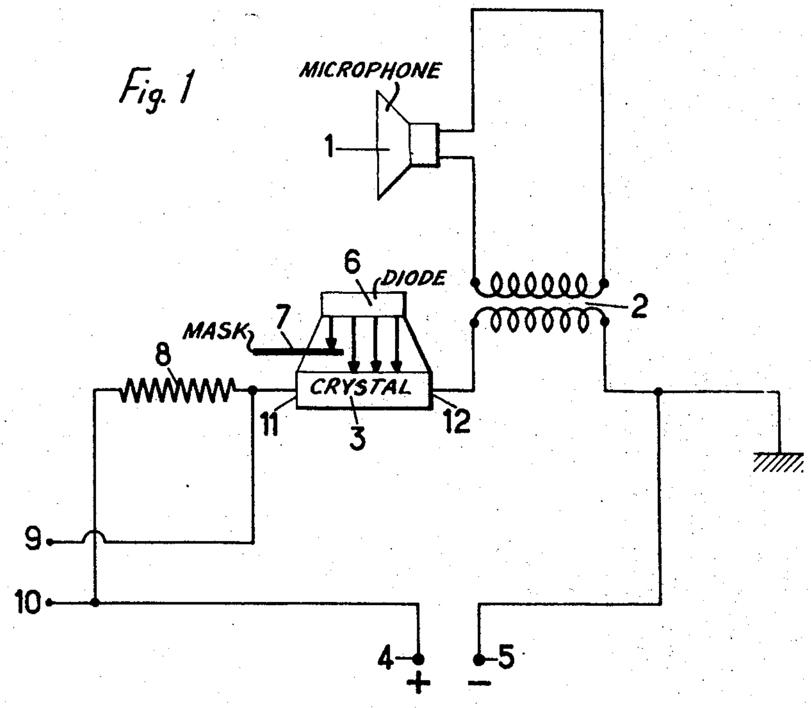

The present invention has for its object a method for converting amplitude modulated signals into frequency modulated signals, comprising using the frequency variations of high frequency oscillations from a special type photo-conductive and piezo-electric semi-conductor crystal, made from mono-crystalline cadmium sulphide when it is supplied with a D.C. voltage or a D.C. current between two electrodes which are disposed at right angles to the plane of its crystalline network hexagon and when it is irradiated by a sufficient light beam impinging on a crystalline face part which is parallel to said hexagon, a mask provided to this end being located at a fixed station and facing the other part of said crystalline face so that the light rays cannot reach said other part.

To this end a crystal can be supplied having a length approximately equal to 5 mm., a width approximately equal to 1 mm. and a thickness in order of 0.5 mm. under a 400 volt D.C. potential, and it is moreover necessary to concentrate the continuous field which crosses said crystal between the two electrodes connected to the D.C. voltage source, on the side of the negative electrode of said source, said concentration being obtained by truncating said crystal on the side of said negative electrode, whereby to reduce the surface of said electrode relatively to that on the side of the positive electrode.

In practice, it has been observed that a 30 volt variation from the instantaneous potential as applied to such a crystal results in a variation of about 1% from the generated oscillation frequency, said frequency being of about one megacycle for a 400 volt D.C. supply.

The signal may be amplitude modulated at will by an ordinary microphone, or supplied from a magnetophone or talking picture pick-up head; by using an amplitude modulation of about 7.5% corresponding to the recited 30 volt variation from the 400 volt supply potential one can obtain e.g. a frequency linearly varying from 995 to 1005 kilocycles according to the amplitude of the modulated signal entering the device, so long as the frequency of the amplitude modulation does not exceed 150 kilocycles.

The frequency modulated signal is fed to the terminals of a resistor member introduced in the D.C. supply circuit of the above-mentioned semi-conductor crystal, which makes it possible, after detection, to obtain audible frequencies lower than 10,000 cycles.

In some applications, such as modulators e.g., it is necessary to permit the D.C. current produced by the D.C. voltage to flow freely and to be able to receive frequencies ranging from a frequency zero (D.C. current) to a frequency up to 150 kilocycles. In other applications wherein it is not necessary to leave the D.C. current to flow freely a condenser having a suitable value which eliminates the D.C. component is provided in the amplitude modulated signal circuit.

For a crystal having the above-mentioned dimensions, the circuit may comprise an input impedance of the order of 5,000 ohms for the amplitude modulated signal and an output impedance of the order of 1,000 ohms from the terminals of which the frequency modulated signal is taken whereby to supply, for example, amplifier stages or frequency multipliers.

Figure 2:
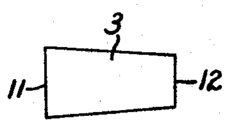

The characteristics of the present invention will be better understood when reading the following illustrative and by no means limitative description of a working arrangement of the converting method according to this invention, taken in conjunction with the accompanying drawings, wherein FIG. 1 shows a schematic circuit for carrying out the invention and FIG. 2 a plan view of the crystal used.

In the drawing, reference numeral 1 indicates a microphone whereby, through a transformer 2, the instantaneous voltage at the secondary winding of the transformer can be amplitude modulated and applied to a semi-conductive and piezo-electric crystal 3 of the mono-crystalline cadmium sulphide type connected to the terminals 4 and 5 of a D.C. voltage source, said crystal 3 being irradiated by a parallel light flux or beam emanating from electroluminescent diodes 6 and being 10% smaller at the end connected to the negative terminal 5.

Over a part of the upper face of crystal 3 is provided a mask 7 whereby said light flux cannot reach a part of said upper face at the end connected to the positive terminal.

In the supply circuit for the semi-conductor crystal 3 a resistor member 8 is introduced, from the terminals of which will be taken, across the terminals 9 and 10 connected to both ends of said resistor, respectively, a frequency modulated signal which, after detection, will give a frequency ranging from 0 to 10 kilocycles or from 20 cycles to 10 kilocycles, as the case may be.

As indicated above, said resistor member 8 may have a value of the order of 1,000 ohms for a crystal having the recited dimensions.

The contacts provided therein on the faces 11 and 12 corresponding to the ends of crystal 3 are constituted by two superimposed layers, namely an indium layer directly deposited under vacuum on the crystal extremities, and a layer of an indium-gallium eutectic deposited upon said first indium layer. As shown in FIG. 2 the face 12 connected to the negative terminal 5 is smaller than the face 11 of the crystal connected to the positive terminal 6 of the D.C. voltage source.

The crystal can be illuminated by 0.1 milliwatt/mm.$^2$ of luminous flux, the light emanating from p-n type biased electroluminescent diodes emitting a green light or a light of lesser wavelength.

What is claimed is:

1. A method of converting amplitude modulated electrical signals into frequency modulated electrical signals by utilizing a single crystal of a semi-conductive, photo-conductive, piezoelectric material having a first face parallel to the hexagon of the crystalline network of said crystal, and two faces transverse to said first face, one of which is larger than the other, which method comprises the steps of projecting light onto only part of said first face, applying a D.C. voltage across said crystal by connecting the larger transverse face of said crystal to the positive terminal and the smaller transverse face of said crystal to the negative terminal of a source of direct voltage, amplitude modulating said D.C. voltage, and deriving a frequency modulated signal across the terminals of a resistance mounted in circuit between said crystal and source.

2. A method according to claim 1, wherein a frequency ranging from 20 cycles to 10,000 cycles is derived after detection.

3. A method according to claim 1 wherein a frequency ranging from zero to 10,000 cycles is derived after detection.

4. A method according to claim 1 wherein said crystal is supplied with a 400 volt D.C. voltage.

5. A method according to claim 1, wherein the light on said crystal is a luminous flux of green light, or a light having a lesser wavelength, emanating from a luminescent diode and the value of which is equal to 0.1 milliwatt/mm.$^2$ of the irradiated surface.

6. A method according to claim 1, wherein a mask is inserted in the path of the light whereby to maintain dark the part of said crystalline face which is connected to the positive electrode.

7. A method as claimed in claim 1 in which the impedance of the circuit comprising the crystal offered to the amplitude modulated signal is 5,000 ohms.

8. A method as claimed in claim 1 in which the resistor across which said frequency modulated signal is derived has a resistance of about 1,000 ohms.

9. A method as claimed in claim 1 in which said D.C. voltage is modulated by means of a microphone.

10. A method as claimed in claim 1 in which the transverse faces of said crystal are connected to said direct voltage source through contacts comprising a first vacuum deposited indium layer and a second layer of indium-gallium eutectic deposited on said first layer.

11. A method as claimed in claim 1 in which said crystal is mono-crystalline cadmium sulphide.

12. A method of converting an amplitude modulated electrical signal into a frequency modulated electrical signal by utilizing a crystal of a photo-conductive, piezoelectric semi-conductive material having a first face parallel to the hexagon of the crystalline lattice of said crystal, and two faces transverse to said first face, one of which is larger than the other, which method comprises the steps of projecting light onto only part of said first face and applying a D.C. voltage across said crystal by connecting the larger transverse face of said crystal to the positive terminal and the smaller transverse face of said crystal to the negative terminal of a source of direct voltage, thereby causing said crystal to oscillate at a frequency dependent on the amplitude of said D.C. voltage, modulating said amplitude to modulate the frequency generated by said crystal, and detecting the modulated frequency across the terminals of a resistance connected in circuit between said crystal and source.

References Cited

UNITED STATES PATENTS

| | | | |
|---|---|---|---|
| 2,776,367 | 1/1957 | Lehovec | 307—311X |
| 3,102,201 | 8/1963 | Braunstein et al. | 250—199 |
| 3,331,036 | 7/1967 | Colbow | 250—199X |
| 3,346,816 | 10/1967 | Midford et al. | 332—3 |
| 3,365,581 | 1/1968 | Tell et al. | 350—160UX |
| 3,435,307 | 3/1969 | Landauer | 331—107GX |
| 3,447,044 | 5/1969 | Sandbank et al. | 317—234(10) |

ALFRED L. BRODY, Primary Examiner

U.S. Cl. X.R.

250—199; 307—311; 331—107; 332—26, 52; 350—160